May 6, 1941.　　　O. L. KETTENBACH　　　2,240,503
APPARATUS FOR THE TREATMENT OF COTTONSEED AND THE LIKE
Filed July 15, 1937　　　2 Sheets-Sheet 1
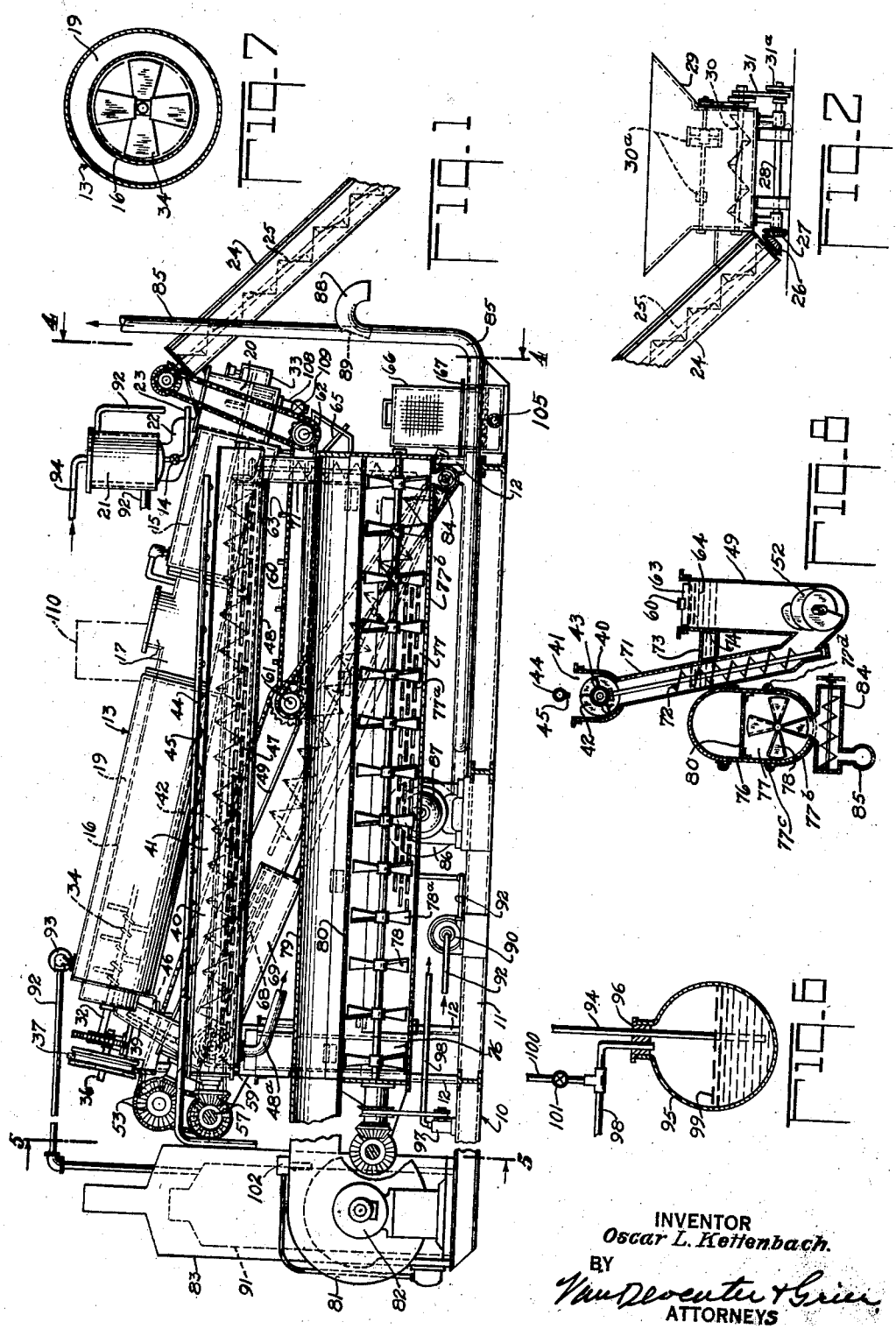
INVENTOR
Oscar L. Kettenbach.
BY
ATTORNEYS May 6, 1941.  O. L. KETTENBACH  2,240,503
APPARATUS FOR THE TREATMENT OF COTTONSEED AND THE LIKE
Filed July 15, 1937   2 Sheets-Sheet 2
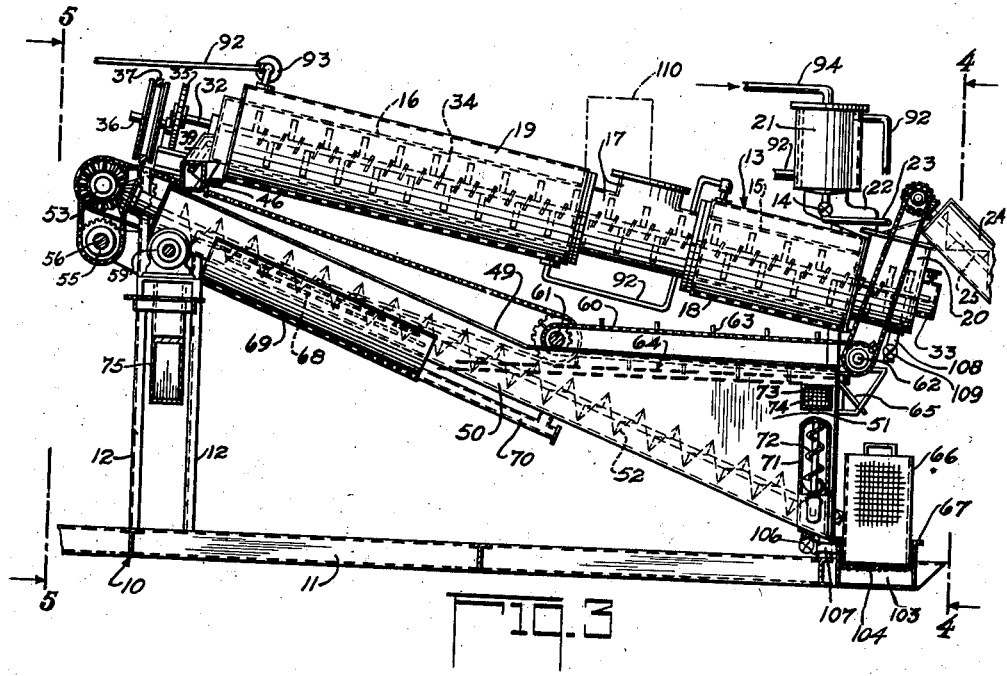
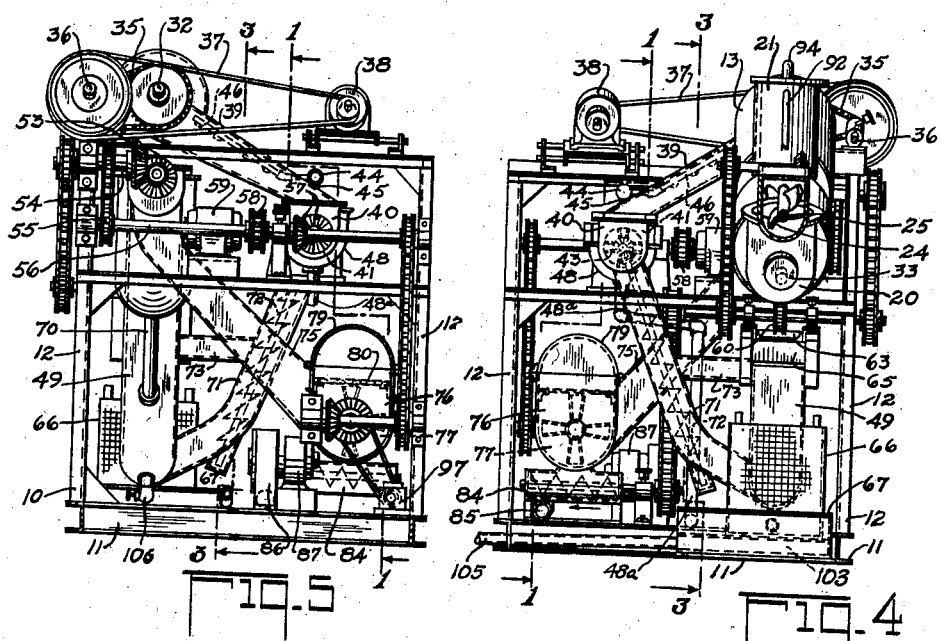
INVENTOR
Oscar L. Kettenbach.
BY
ATTORNEYS Patented May 6, 1941

2,240,503

UNITED STATES PATENT OFFICE 2,240,503

APPARATUS FOR THE TREATMENT OF COTTONSEED AND THE LIKE

Oscar L. Kettenbach, Tucson, Ariz., assignor to Chemical Seed Treating and Delinting Corporation, a corporation of Arizona Application July 15, 1937, Serial No. 153,734

3 Claims. (Cl. 83—27)

This invention relates to improvements in processes and apparatus for the treatment of cottonseed and the like.

An object of the invention is to provide an improved process for removing lint and other undesirable material from cottonseed.

A further object is to provide a process of the above nature including the application of heated acid to the seed.

Another object is to provide means for carrying out the above process, said means being adapted to receive the seed, conduct it throughout the complete process of delinting by acid action, washing, separating and drying, and to eject the completely processed seed in a manner convenient for storage or shipment.

Another object is to provide means of the above type which is readily controllable and adapted to automatic operation.

Still a further object of the invention is to provide means in the system to separate and eliminate from the run of seed all light, sterile, arid, immature seeds, as well as all pods, leaves, sticks and light trash, so that the germination of the finished product may be a maximum regardless of how poor in germination the untreated supply of seed may be.

Still another object is to provide apparatus of the above character which is substantially self-contained and which is compact and economical in operation.

Other objects and advantages of the invention will appear during the course of the following description in connection with the accompanying drawings in which:

Figure 1 is a longitudinal view of the device partly in section;

Figure 2 is a fragmental view supplementary to Figure 1 and disclosing the loading means;

Figure 3 is a longitudinal view showing the details of the delinter apparatus and the floater;

Figure 4 is an end sectional view on the lines 4—4, Figures 1 and 3;

Figure 5 is a similar view on the lines 5—5, Figures 1 and 3;

Figure 6 shows a suitable arrangement of an acid storage receptacle for use with the apparatus;

Figure 7 is a sectional detail view of the delinter; and Figure 8 is a fragmental sectional view of the washer, floater and dryer.

Referring to Figures 1 and 3, the numeral 10 generally indicates a frame, preferably of structural steel construction, comprising a base 11 and side uprights 12. Attached to the rear uprights 12 is an inclined structure 13, hereinafter generally referred to as the delinter, and comprising two aligned cylindrical sections 15 and 16 joined by an intermediate T section 17. The sections 15, 16 and 17 are preferably made of cast iron, and sections 15 and 16 are provided with water jackets 18 and 19. An upwardly opening hopper 20 is provided on the lower end of the first section 15. A water-jacketed tank 21 is supported on a bracket 22 above the section 15, and a pipe 23, controllable by a valve 14, leads out of the bottom of tank 21 to deliver fluid therefrom into the hopper 20.

An inclined spiral conveyor 24, Figures 1 and 2, is adapted to deliver seeds or similar material into the hopper 20, the conveyor shaft 25 having on its lower end a bevel gear 26, Figure 2, meshing with a second bevel gear 27 on a horizontal shaft 28 supported under a feeding bin 29. A short horizontal screw feeder 30 in the bottom of bin 29 is driven from shaft 28 by any suitable means such as a belt 31 on step pulleys 31a, and is adapted to force material from the bin 29 into the inclined conveyor 24. Rotating agitators 30a in the bin 29 prevent clogging and insure proper feeding by the screw 30.

A rotary shaft 32, Figures 1, 3 and 5, extends through the delinter 13, the lower bearing 33 being sealed to prevent egress of fluid from the hopper 20. The shaft 32 carries a plurality of spirally inclined paddles 34 adapted to impel material being treated upward through the delinter 13 from the hopper 20, the shaft 32 being driven through a chain 35 from a jack-shaft 36 which in turn is driven via a V-belt 37 by a reversible and variable speed motor 38, Figures 4 and 5.

A chute 39 leads diagonally downward from the upper end of the delinter section 16 into one end of a washer 40 comprising an elongated trough 41, Figure 1 in which is rotatably mounted a suitable screw conveyor 42 which may be equipped with "pick-ups" or small fins 43, Figure 4, for the purpose of thoroughly stirring the seed as it is being washed. A water-pipe 44 overlies the trough 41 and is equipped with downwardly directed spray nozzles 45. The water-pipe is adapted to be connected to any suitable source of water supply. A sloping branch 46 of pipe 44, also equipped with nozzles, is located in the top of the inclined chute 39 as shown in Figures 4 and 5. Perforations 47 are provided in the bottom of the washing trough 41 to allow exit of water therefrom into a drain-trough 48 having an outlet pipe 48a leading to a sump 103 hereinafter described, adapted to be connected to any suitable drain.

Situated directly below the delinter 13 is a structure 49 generally referred to hereinafter as the floater. The floater 49 has a sharply inclined trough 50, the lower portion of which has high sides and ends forming a triangular tank 51, Figure 3. A sloping screw conveyor 52, closely following the bottom of the trough 50 throughout its length, is adapted to be driven through bevel gears 53 from a cross shaft 54, the cross shaft 54 being driven by a chain 55 from a second cross shaft 56 which also drives the washer conveyor 42 through bevel gears 57, the second cross shaft 56 in turn being driven via a chain 58 by a motor 59, Figures 1, 4 and 5.

A substantially horizontal chain 60, Figures 1, 3 and 4, disposed above the triangular tank 51 and provided with sprocket shafts 61 and 62, carries a series of paddles or skimmers 63 adapted to engage and skim the surface 64 of the water in the tank 51 as hereinafter described. The skimmers 63 over-ride a downwardly inclined lip 65 in the end of the tank 51 above a basket or other suitable receiver 66 removably supported in ways 67 on the base 11. The ways 67 enclose a sump 103 on the top of which is a removable screen 104. The sump is provided with an outlet pipe 105 leading to any suitable drain. A valve 106 and pipe 107 provide means of draining the floater tank 51 into the sump through the screen 104. The washer outlet pipe 48a also drains into the sump through the screen, and a pipe 108 and valve 109, Figure 3, allow the material in hopper 20 to be discharged either into the basket 66 or on the screen 104 when desired, for instance when washing out the delinter.

The upper portion of the inclined floater trough 50 has perforations 68, Figures 1 and 3, under which is supported a drip trough 69 provided with a return pipe 70 leading back into the floater.

From the delivery end of the washer 40 an inclined chute 71, Figures 1, 3, 4 and 5, leads downward and curves into the bottom corner of the triangular tank 51 of the floater 49. A screw conveyor 72 is provided in the chute 71 to force the seeds downward from the washer and deliver them into the floater. A horizontal cross passage 73 leads from the upper part of the tank 51 to the inclined chute 71, serving to equalize the water level in these structures, and is provided with a screen 74.

An inclined delivery passage or pipe 75 leads from the upper end of the floater trough 50 to the end of a substantially horizontal structure 76, generally referred to herein as the dryer and comprising a trough 77 provided with a paddle conveyor 78, having agitators 78a and driven by a suitable chain and bevel gearing from the shaft 56. A hood 79 is hinged to the top of the trough 77 so as to cover the entire top thereof, a removable screen 80 being provided between the interiors of the two structures. A blower 81, Figure 1, operable by a motor 82, is adapted to draw air from a suitable air heater 83 controllable in any well-known manner by a thermostat 102, and deliver it to the interior of the hood 79. The bottom of the trough 77 is provided throughout with slots or perforations 77a for the egress of air, some of these slots being omitted in Figure 1 to clarify the drawing.

A small horizontal screw conveyor 84 is adapted to receive dried material from the delivery end of the dryer conveyor 78 and in turn move it to a delivery pipe 85. A second blower 86, driven by a motor 87, forces a blast of air through the pipe 85 to eject the finished material received from the conveyor 84. The ejector pipe 85 is adapted to deliver the material to any desired destination such as cars, bins or to suitable dusting device, and is provided with an auxiliary outlet spout 88, Figure 1, controllable by an internal flap valve 89. It will be noted in Figures 1, 4 and 5 that the small ejector conveyor 84 and the initial feed screw 25 are both driven through chain linkages from the same motor 59, so that the relative speeds of the two remain the same at all times, ensuring proper ejection.

A motor driven pump 90, Figure 1, is adapted to circulate warm water from a water heater 91 through the jackets of the delinter 13 and acid tank 21 via suitable piping 92, part of which piping is cut away in the drawings to avoid undue complication. The temperature of the jacket water may be controlled by a thermostat 93, Figures 1 and 3, arranged in the piping system 92. As the operation of such thermostatic controllers is well-known, further description herein is unnecessary.

To replenish the supply of acid in the jacketed tank 21 the latter has a pipe line 94 leading to a storage drum 95, Figure 6, located at any convenient point near the remainder of the apparatus. The pipe line 94 enters the drum 95 through a sealing plug 96 and terminates near the bottom of the drum. An air compressor 97, Figures 1 and 5, has a discharge line 98 also entering the drum 95 through the plug 96 but terminating at the inside of the plug and therefore above the level of the acid 99. Operation of the compressor 97 causes an air pressure to be built up in the drum 95 above the acid 99, which pressure forces the acid through the pipe line 94 to the jacketed feed tank 21. An escape pipe 100 forming a branch of the air pipe 98 is provided with a valve 101 by means of which the pressure in the drum 95 and hence the flow of acid to the tank 21 may be regulated.

The operation of the device is as follows, dealing with cottonseed as a typical material to be processed.

Fuzzy cottonseed is moved from the feeding bin 29 by the feed screw 30 and deposited in the hopper 20 by the inclined conveyor 24. The speed of the feeder screw 30 is adjustable by means of the step pulleys 31a so that the amount of seed being fed may be regulated. In the hopper 20 the seed is mixed with a regulated amount of acid fed through the pipe 23 and valve 14 from the water-jacketed tank 21 which, as previously noted, receives its acid supply from the storage drum 95, Figure 6. The paddles 34, Figure 3, thoroughly mix the seed and acid and propel the mixture upward through the delinter 13, the T section 17 providing an upwardly directed opening through which the material may be inspected in its passage from the section 15 to the section 16.

The heat supplied by the water-jackets of the tank 21 and delinter 13 keep the acid at the best temperature for proper delinting. At the same time, the heat increases the fluidity of the acid so that as the mixture travels up through the delinter 13 the free acid readily separates from the seed and drains back to the hopper 20. Thus, when the seed, having had its fuzz removed by the acid, emerges from the upper end of the delinter it carries no acid which can be removed by drainage or pressure, the controlled heating of the acid thereby keeping the consumption of acid to a minimum with a resultant saving in cost of operation, as well as delinting more efficiently than is possible with cold acid. In normal operation the temperature is held between 110 and 125 degrees Fahrenheit. In this range the delinting action is rapid and efficient, while the temperature of the acid is not sufficiently high to damage the seed.

The cast iron paddles 34 propel the delinted seed from the delinter into the inclined chute 39 down which the material travels to the conveyor 42 in the washer 42. In its passage down the chute 39 the seed receives a spray of water from the branch pipe 46 which spray starts the washing process and at the same time assists the movement of the seed down the chute.

The conveyor 42 receives the seed from the chute 39 and moves it along the washer through 41 during which process a spray water is played on the seed from the nozzles 45 of the pipe 44. As the seed is moved along the trough by the conveyor 42 the "pickups" 43, Figures 4 and 8, thoroughly stir the seed to expose it uniformly to the washing water. The water, having washed the seed, drips through the perforations 41 in the drain trough 48, thence out to the sump 103 via the pipe 48a. If desired, solid residue from the wash water may be collected from the sump screen 104 and sold for fertilizer or the like.

The seed having traveled throughout the entire length of the trough 41 and having been thoroughly washed therein, is delivered into the chute 71 containing the screw conveyor 72. The conveyor 72 forces the seed down the chute and delivers it to the floater 49 at a point near the bottom of the triangular tank 51, as shown in section in Figure 8.

The heavy, fertile seeds are carried up the inclined floater trough 50, while the light, sterile and immature seeds, as well as any leaves, sticks, pods, or other light trash, rise to the surface of the water in the tank 51 and are skimmed off into the basket 66 by the paddles 63, Figure 1. As the heavy seed is carried above the water level in the trough 51, excess water drains therefrom through the perforations 68, thence back into the floater through the pipe 70.

Emerging from the top of the floater 49, the seed passes down the delivery passage 75 to the dryer 76. Here the seed is propelled along the trough 77 by the paddles conveyor 78, the agitators 78a meanwhile stirring or agitating the seed. A blast of heated air, delivered from the heater 83 by the blower 81 via the hood 79 and screen 80, passes over and through the agitated seed throughout the entire length of the dryer, the air finding egress through the perforations 77a. The temperature of air blast as previously noted, may be controlled by means of the thermostat, the upper limit of temperature being about 75 degrees Fahrenheit.

The seed, having been thoroughly dried, drops into the small horizontal conveyor 84 which propels it into the discharge pipe 85 through which a blast of air from the blower 86 ejects the seed for storing, sacking or dusting as previously set forth.

The controls for the various motors, which controls may be of conventional types and are therefore omitted from the drawings to avoid unnecessary complication, may be grouped on a panel board such as is indicated in dotted and dashed lines at 110, Figures 1 and 3, conveniently mounted in any suitable manner adjacent the inspection T 17.

The motor 38 being variable in speed permits the speed of delinting to be readily adjusted to provide for proper duration for different types of seed, seeds with heavy fuzz requiring longer acid action for perfect delinting than do these with lighter fuzz. The inspection T 17 permits the operator to readily gage the proper speed of the motor 38 and proper amount of acid feed by the appearance of the seed passing upward through the delinter. The motors 38 and 59 being reversible, the machine may readily be run backward to facilitate cleaning at the end of a day's run or whenever desired.

The process described delivers seed which is clean, free from disease, and capable of germination in forty-eight hours, whereas untreated seed normally requires eight or more days. Due to the action of the floater, as described, the finished seed germinates 95 per cent or more, irrespective of how poor in germination the original untreated seed may have been. The light seed deposited in the basket 66, which is usable for purposes other than planting, may be dried and sacked separately if desired.

The bottom midportion 77b of the trough 77 may be hinged to swing downward for cleaning, being provided with hinges 77q and suitable latches 77d as shown in Figure 8. Throughout all the conveyors a clearance of about ¼ inch is provided between the impellers and the casings, thus avoiding grinding and breaking of the seed.

It will be seen from the foregoing description that the device as described provides means to carry out a complete and thorough delinting process, the apparatus being compact, readily controllable, economical, largely automatic in action, and the resulting product being of the highest quality for its purpose.

While the invention has been described in preferred form it is not limited to the precise structures illustrated, as various changes and modifications may be made without departing from the scope of the appended claims.

What is claimed is:

1. In a device of the character described, in combination, a delinter adapted to subject seed to the action of acid, a washer, means to conduct said seed from said delinter into said washer, a floater comprising an inclined trough having raised walls forming a tank at the lower end thereof and containing a bath of water, means to force said seed from said washer directly into the bottom of said tank whereby light material among said seed may separate from the heavy seed and float to the surface of said bath, a mechanical skimmer traversing substantially the entire top of said tank and adapted to remove said light material from said surface, and a conveyor extending along the entire inclined bottom of said trough in unobstructed communication with said bath, said conveyor being adapted to move said heavy seed upward through said trough.

2. In a device of the character described, in combination; a frame; an inclined delinter mounted thereon and adapted to continuously subject seed to the action of acid whereby lint may be removed from said seed; a washer supported on said frame beside said delinter and adapted to cleanse said seed of said removed lint and surplus acid; a floater supported on said frame under said delinter and operable to separate trash and imperfect grains from said seed by flotation, means to extract said trash and imperfect grains from said floater; an elongated dryer on said frame under said washer and adapted to condition said seed for shipment and storage; said delinter, washer, floater and dryer each including rotary conveying means to move seed therethrough; a motor operatively connected to said rotary means of said delinter, said motor being variable in speed whereby the time of action of said acid on said seed may be controlled; a second motor operatively connected to said rotary means of said washer, floater and dryer; conducting passages from said delinter to said washer, from said washer into the lower portion of said floater, and from said floater into said dryer; and mechanical means to remove dried seed from said dryer.

3. A device as claimed in claim 2 including an acid tank, adjustable means to feed acid from said tank into said delinter, said delinter and tank having water jackets, a water heater on said base, means to circulate water from said heater through said jackets, and a thermostat adapted to control the temperature of said water, whereby the temperature and viscosity of said acid may be controlled to regulate the chemical action of said acid on said seed.

OSCAR L. KETTENBACH.